3,184,434
FLUORENE SULFONIC ACID CONTAINING DYEABLE POLYESTERS
Christian F. Horn, South Charleston, W. Va., assignor to Union Carbide Corporation, a corporation of New York
No Drawing. Filed Mar. 20, 1961, Ser. No. 96,675
5 Claims. (Cl. 260—75)

This invention relates to new condensation polymers. The invention also relates to fibers, filaments, yarns, films, and other structures of said polymers, which have an affinity for dyestuffs.

Linear polyesters are well known and are readily prepared by the reaction of dihydric alcohols or their functional derivatives with dibasic carboxylic acids, their ester forming derivatives, hydroxy carboxylic acids, and their polymer forming derivatives. The high molecular weight linear polyesters can be used, for example, to produce filaments, fibers, films, and the like. Of particular interest are the polyesters of terephthalic acid and its esters with glycols, such as polyethylene terephthalate, and the polyester from dimethyl terephthalate and 1,4-cyclohexanedimethanol. However, the filamentous products produced from these polyesters have little affinity for dyestuffs by conventional dyeing procedures, and consequently, their utility in the fabric field is somewhat restricted.

It was to be expected that many efforts would be made to improve the dyeability of a film- and filament-forming material having as many desirable characteristics as those possessed by polyethylene terephthalate. Such efforts have indeed been made. Unfortunately, however, the efforts that have resulted in some degree of success in making polyethylene terephthalate more dyeable have done so only at the expense of degrading the polymer substantially with respect to its other characteristics. Thus, for example, a reported effort to improve the dyeability of polyethylene terephthalate by incorporating within its structure minor amounts of certain amino alcohols and thereby giving the polymer a greater ability to absorb acetate dyes and acid dyes, seriously reduces the heat stability of the polyethylene terephthalate so modified. Another effort in this direction involved chemical incorporation of long chain polyalkylene oxides having molecular weights of the order of 1000 to 6000. This modification of the polyethylene terephthalate unfortunately made it quite sensitive to air oxidation and to light. Another proposal involved the utilization of toxic carriers such as the chlorobenzenes, chlorophenols, and the like, for the dyeing process. Still another involved the application of vat or acetate dyes under superatmospheric pressure at temperatures above 100° C. Another required the use of fiber swelling agents or dye carriers. Still another involved the use of pigments that are mixed directly with the polyethylene terephthalate melt before spinning.

It is apparent that these efforts have had no or very limited success. The methods involving chemical incorporation of modifying agents such as amino alcohols and polyalkylene oxides have involved substantial reduction in thermal stability, the use of toxic carriers is inherently undesirable and dangerous, and special dyeing techniques, such as those requiring dyestuffs that are stable at high temperatures, are too expensive to be commercially practicable.

These difficulties have now been overcome without significantly impairing the characteristics of polyethylene terephthalate. Thus, for example, polyethylene terephthalate fibers and films made in accordance with the method of this invention are readily dyeable by ordinary dyeing techniques while at the same time retaining excellent heat stability, dimensional stability and strength.

The modified linear polyesters of this invention are produced from an aromatic dicarboxylic acid, or ester forming derivative thereof, with a diol, such as an alicyclic glycol, an aromatic diol, an aliphatic-aromatic diol, an aliphatic glycol or a diester of an aromatic diol, and a small amount of a sulfonated fluorene compound containing at least one sulfonic acid group in the form of the free acid or a metal salt thereof.

The sulfonated fluorene compounds used to produce the modified linear polyesters of this invention are the monosulfo- and disulfo-9,9-di-(carboxyalkyl)-fluorenes, their monovalent metal sulfonate salts, their acyloxymetallo sulfonate salts, and the esters thereof, as represented by the generic formula:

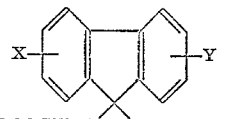

ROOCH$_{2n}$C$_n$    C$_n$H$_{2n}$COOR      (I)

wherein X represents an X' or X'' group; Y represents a Y' or —SO$_3$M'Z group; and X', X'', Y', M' Z, R, and $n$ have the meanings hereinafter defined. Compounds encompassed by this formula are (II) the monosulfo-9,9-di-(carboxyalkyl)-fluorenes, the disulfo-9,9-di-(carboxyalkyl)-fluorenes, including their monovalent metal salts, and esters thereof; and (III) the mono-(acyloxymetallosulfo)-9,9-di-(carboxyalkyl)-fluorenes, the di-(acyloxymetallosulfo)-9,9-di-(carboxyalkyl)-fluorenes, and esters thereof.

The monosulfo-9,9-di-(carboxyalkyl)-fluorene and disulfo-9,9-di-(carboxyalkyl)-fluorene compounds used to produce the modified linear polyesters of this invention can be represented by the following sub-generic formula:

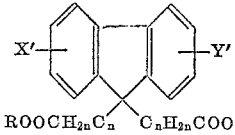

ROOCH$_{2n}$C$_n$    C$_n$H$_{2n}$COOR      (II)

wherein X' represents a hydrogen atom or a Y' radical; Y' represents an —SO$_3$H radical, or an —SO$_3$M radical; M represents a monovalent Group I metal atom, for example, lithium, sodium, potassium, rubidium, or cesium; R represents a hydrogen atom or a monovalent hydrocarbyl radical, such as an alkyl group containing from 1 to about 10 carbon atoms, for example, methyl, ethyl, propyl, isopropyl, butyl, pentyl, hexyl, 2-ethylbutyl, heptyl, octyl, decyl, and the like; and $n$ is an integer having a value of from 1 to about 10, preferably from 2 to about 6.

Thus the monosulfo-9,9-di-(carboxyalkyl) - fluorenes useful as modifiers in this invention are represented by the formula:

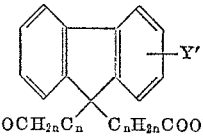

ROOCH$_{2n}$C$_n$    C$_n$H$_{2n}$COOR      (II-A)

and the disulfo-9,9-di-(carboxyalkyl)-fluorenes are represented by the formula:

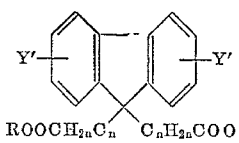

ROOCH$_{2n}$C$_n$    C$_n$H$_{2n}$COOR      (II-B)

The 9,9-di-(carboxyalkyl)-fluorenes, which are used as starting materials for producing the monosulfo-9,9-di-(carboxyalkyl)-fluorene and disulfo - 9,9 - di - (carboxyalkyl)-fluorene derivatives, are members of a class of known compounds. The sulfonated fluorene compounds falling with the scope of Formulae II–A and II–B are produced by known sulfonation procedures. Thus, for example, the 9,9-di-(carboxyalkyl)-fluorenes represented by the general formula:

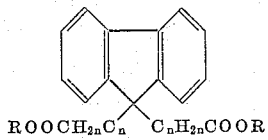

can be sulfonated with concentrated sulfuric acid. At temperatures up to about 65° C., monosulfonation predominates, and yields of 80 percent or better of the monosulfonic acid derivative are obtained. At temperatures above 65° C. and preferably from about 90° C. to about 130° C., disulfonation is the predominating reaction. In both instances, however, small yields of the other sulfonic acid derivatives are also produced; and varying the temperature employed results in varying the ratio of monosulfo and disulfo compounds formed.

Illustrative of the monosulfo-9,9-di-(carboxyalkyl)-fluorenes and the disulfo-9,9-di-(carboxyalkyl)fluorenes which can be used as modifiers to produce the dyeable linear polyesters of this invention one can mention:

Lithium 9,9-di-(2'-carboxyethyl)-fluorene-2-sulfonate,
Lithium 9,9-di-(3'-carboxypropyl)-fluorene-2-sulfonate,
Lithium 9,9-di-(4'-carboxybutyl)-fluorene-2-sulfonate,
Lithium 9-(2'-carboxyethyl)-9-(7'-carboxyheptyl)-fluorene-2-sulfonate,
Sodium 9,9-di-(3'-carboxypropyl)-fluorene-2-sulfonate,
Sodium 9-(2'-carboxyethyl)-9-(5'-carboxypentyl)-fluorene-2-sulfonate,
Potassium 9,9-di-(2'-carboxyethyl) - fluorene-2-sulfonate,
Potassium 9-(2'-carboxyethyl)-9-(3'-carboxypropyl)-fluorene-2-sulfonate,
Potassium 9-(2'-carboxyethyl)-9-(6'-carboxyhexyl)-fluorene-2-sulfonate,
Rubidium 9,9-di-(2'-carboxyethyl)-fluorene-2-sulfonate,
Rubidium 9-(2'-carboxyethyl)-9-(5'-carboxypentyl)-fluorene-2-sulfonate,
Cesium 9,9-di-(2'-carboxyethyl)-fluorene-2-sulfonate,
Dilithium 9,9-di-(2'-carboxyethyl)-fluorene-2,7-disulfonate,
Dilithium 9-(2'-carboxyethyl)-9-(3'-carboxypropyl)-fluorene-2,7-disulfonate,
Dilithium 9-(2'-carboxyethyl)-9-(4'-carboxybutyl)-fluorene-2,7-disulfonate,
Dilithium 9-(2'-carboxyethyl)-9-(8'-carboxyoctyl)-fluorene-2,7-disulfonate,
Disodium 9,9-di-(2'-carboxyethyl)-fluorene-2,7-disulfonate,
Disodium 9-(2'-carboxyethyl)-9-(4'-carboxybutyl)-fluorene-2,7-disulfonate,
Dipotassium 9,9-di-(2'-carboxyethyl)-fluorene-2,7-disulfonate,
Dipotassium 9-(2'-carboxyethyl)-9-(5'-carboxypentyl)-fluorene-2,7-disulfonate,
Dirubidium 9,9-di-(3'-carboxypropyl)-fluorene-2,7-disulfonate,
Dicesium 9-(2'-carboxyethyl)-9-(3'-carboxypropyl)-fluorene-2,7-disulfonate,
Lithium 9-(2'-carbomethoxyethyl)-9-(5'-carbomethoxypentyl)-fluorene-2-sulfonate,
Sodium 9,9-di-(2'-carbomethoxyethyl)-fluorene-2-sulfonate,
Potassium 9,9-di-(3'-carbomethoxypropyl)-fluorene-2-sulfonate,
Cesium 9,9-di-(2'-carbomethoxyethyl)-fluorene-2-sulfonate,
Sodium 9,9-di-(3'-carboethoxypropyl)-fluorene-2-sulfonate,
Potassium 9-(2'-carboethoxyethyl)-9-(7'-carboethoxyheptyl)-fluorene-2-sulfonate,
Potassium 9,9-di-(2'-carboisopropionoxyethyl)-fluorene-2-sulfonate,
Lithium 9,9-di-(2'-carbopropionoxyethyl)-fluorene-2-sulfonate,
Sodium 9-(2'-carbobutanoxyethyl)-9-(3'-carbobutanoxypropyl)-fluorene-2-sulfonate,
Lithium 9,9-di-(2'-carbopentanoxyethyl)-fluorene-2-sulfonate,
Sodium 9-(2'-carbopentanoxyethyl)-9-(4'-carbopentanoxybutyl)-fluorene-2-sulfonate,
Sodium 9,9-di-(3'-carboheptanoxypropyl)-fluorene-2-sulfonate,
Sodium 9-(2'-carbooctanoxyethyl)-9-(4'-carbooctanoxybutyl)-fluorene-2-sulfonate,
Potassium 9,9-di-(2'-carbononanoxyethyl)-fluorene-2-sulfonate,
Potassium 9,9-di-(2'-carbodecanoxyethyl)-fluorene-2-sulfonate,
Disodium 9,9-di-(2'-carbomethoxyethyl)-fluorene-2,7-disulfonate,
Disodium 9-(2'-carbomethoxyethyl)-9-(3'-carbomethoxypropyl)-fluorene-2,7-disulfonate,
Dirubidium 9,9-di-(2'-carboethoxyethyl)-fluorene-2,7-disulfonate,
Dicesium 9-(2'-carbopropionoxyethyl)-9-(3'-carbopropionoxypropyl)-fluorene-2,7-disulfonate,
Disodium 9-(2'-carboethoxyethyl)-9-(5'-carboethoxyphenyl)-fluorene-2,7-disulfonate,
Disodium 9,9-di-(2'-carbobutanoxyethyl)-fluorene-2,7-disulfonate,
Dilithium 9-(2'-carbohexanoxyethyl)-9-(3'-carbohexanoxypropyl)-fluorene-2,7-disulfonate,
Dilithium 9-(2'-carbooctanoxyethyl)-9-(3'-carbooctanoxypropyl)-fluorene-2,7-disulfonate,
Disodium 9,9-di-(2'-carbononanoxyethyl)-fluorene-2,7-disulfonate,
Dipotassium 9,9-di-(2'-carbodecanoxyethyl)-fluorene-2,7-disulfonate, and the like.

The mono-(acyloxymetallosulfo)9,9-di-(carboxyalkyl)-fluorene and di-(acyloxymetallosulfo) - 9,9 - di-carboxyalkyl)-fluorene compounds which can be used to produce the modified linear polyesters of this invention are represented by the following sub-generic formula:

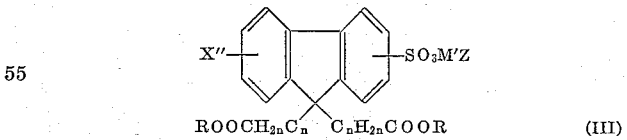

(III)

wherein X" represents a hydrogen atom, or an —SO$_3$M'Z radical; M' represents a divalent metal atom, for example, beryllium, magnesium, calcium, zinc, strontium, barium, or tin; Z represents an acyloxy radical —OOCR"; R" represents a monovalent hydrocarbyl radical, such as, an alkyl group containing from 1 to about 10 carbon atoms, for example, methyl, ethyl, propyl, isopropyl, butyl, pentyl, hexyl, 2-ethylbutyl, heptyl, octyl, 2-ethylhexyl, decyl, and the like, or an aryl radical, for example, phenyl, naphthyl, and the like, or an aralkyl radical, for example, benzyl, phenethyl, and the like, or an alkaryl radical, for example, tolyl, xylyl, and the like; R represents a hydrogen atom, or an alkyl radical containing from 1 to about 10 carbon atoms; and $n$ is an integer having a value of from 1 to about 10, preferably from 2 to about 6.

Thus, the mono-(acyloxymetallosulfo)-9,9-di-(carboxyalkyl)-fluorene compounds useful in this invention are represented by the formula:

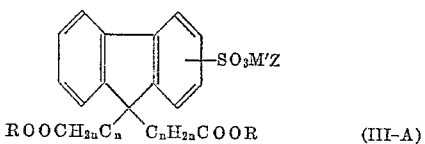

and the di-(acyloxymetallosulfo)-9,9-di-(carboxyalkyl)-fluorene compounds can be represented by the formula:

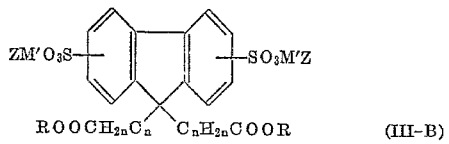

The acyloxymetallosulfo - 9,9 - di-(carboxyalkyl)-fluorenes are produced by the reaction of a divalent metal salt of a monocarboxylic acid represented by the general formula $M'(OOCR'')_2$ with the free sulfonic acid compounds encompassed within the scope of sub-generic Formula II.

The acyloxymetallosulfo - 9,9 - di-(carboxyalkyl)-fluorene compounds of Formula III can be produced by heating a mixture of the fluorene sulfonic acid of Formula II and the divalent metal salt of the monocarboxylic acid. The reaction is preferably carried out using a large excess of the divalent metal acylate in the presence of a solvent. Suitable solvents are, for example, acetic acid, propionic acid, methanol, ethanol, benzene, toluene, hexane, heptane, cyclohexane, and so forth.

The divalent metal acylate is used in excess to ensure complete conversion and to prevent formation of the metal disulfonate salt. However, from about 0.5, or less, to about 10 equivalents, or more, of divalent metal acylate per equivalent of sulfonic acid radicals present in the fluorene sulfonic acid can be charged. The reaction can be carried out at any convenient temperature, and is preferably conducted at temperatures of from about 50° C. to about 150° C., most preferably at the reflux temperature of the solvent used.

In a typical reaction, a hot solution of magnesium in acetic acid is added to a hot solution of 9,9-di-(carboxymethyl)-fluorene-2-sulfonic acid and 2-acetoxymagnesiumsulfo-9,9-di-(carboxymethyl)-fluorene is produced. By the substitution of 9,9-di-(carboxymethyl)-fluorene-2,7-disulfonic acid, 2,7 - di-(acetoxymagnesiumsulfo)-9,9-di-(carboxymethyl)-fluorene is produced.

Among the divalent metal acylates which can be used one can mention:

Beryllium acetate,
Beryllium propionate,
Beryllium butyrate,
Beryllium octanoate,
Beryllium benzoate,
Beryllium toluate,
Magnesium acetate,
Magnesium benzoate,
Magnesium laurate,
Magnesium salicylate,
Calcium acetate,
Calcium benzoate,
Calcium butyrate,
Calcium formate,
Calcium isobutyrate,
Calcium toluate,
Zinc acetate,
Zinc benzoate,
Zinc caproate,
Zinc nonanoate,
Zinc formate,
Strontium acetate,
Strontium pentoate,
Strontium formate,
Strontium benzoate,
Strontium toluate,
Barium acetate,
Barium benzoate,
Barium butyrate,
Barium decanoate,
Stannous acetate,
Stannous propionate,
Stannous benzoate,
Stannous 2-ethylhexanoate, et cetera.

Illustrative of the mono-(acyloxymetallosulfo)-9,9-di-(carboxyalkyl)fluorenes and di-(acyloxymetallosulfo)-9,9-di-(carboxyalkyl)-fluorenes which can be used as modifiers to produce the linear polyesters of this invention one can mention:

2-hexanoyloxybariumsulfo-9,9-di-(3'-carboxypropyl)-fluorene,
2-propionoxycalciumsulfo-9,9-di-(2'-carboxyethyl)-fluorene,
2-propionoxyzincsulfo-9,9-di-(2'-carboxyethyl)-fluorene,
2-propionoxystannoussulfo-9,9-di-(2'-carboxyethyl)-fluorene,
2-pentanoyloxyberylliumsulfo-9-(2'-carboxyethyl)-9-(4'-carboxybutyl)-fluorene,
2-butanoyloxybariumsulfo-9-(2'-carboxyethyl)-9-(8'-carboxyoctyl)-fluorene,
2-octanoyloxycalciumsulfo-9,9-di-(carboxymethyl)-fluorene,
2-benzoyloxybariumsulfo-9,9-di-(2'-carboxyethyl)-fluorene,
2,7-di-(acetoxybariumsulfo)-9,9-di-(2'-carboxyethyl)-fluorene,
2,7-di-acetoxystrontiumsulfo)-9-(2'-carboxyethyl)-9-(4'-carboxybutyl)-fluorene,
2,7-di-(butanoyloxycalciumsulfo)-9,9-di-(2'-carboxyethyl)-fluorene,
2,7-di-butanoyloxyzincsulfo)-9-(2'-carboxyethyl)-9-(7'-carboxyheptyl)-fluorene,
2,7-di-(pentanoyloxystannoussulfo)-9-(2'-carboxyethyl)-9-(3'-carboxypropyl)-fluorene,
2,7-di-(hexanoyloxyberylliumsulfo)-9,9-di-(2'-carboxyethyl)-fluorene,
2,7-di-(hexanoyloxymagnesiumsulfo)-9,9-di-(4'-carboxybutyl)-fluorene,
2,7-di-(heptanoyloxybariumsulfo)-9,9-di-(2'-carboxyethyl)-fluorene,
2,7-di-(heptanoyloxystannoussulfo)-9-(2'-carboxyethyl-9-(5'-carboxyphentyl)-fluorene,
2,7-di-(octanoyloxycalciumsulfo)-9-(2'-carboxyethyl)-9-(3'-carboxypropyl)-fluorene,
2,7-di-(nonanoyloxybariumsulfo)-9,9-di-(2'-carboxyethyl)-fluorene,
2,7-di-(decanoyloxybariumsulfo)-9,9-di-(2'-carboxyethyl)-fluorene,
2,7-di-(benzoyloxybariumsulfo)-9,9-di-(2'-carboxyethyl)-fluorene,
2,7-di-(toluyloxybariumsulfo)-9,9-di-(2'-carboxyethyl)-fluorene,
2-pentanoyloxystannoussulfo-9,9-di-(2'-carbopropoxyethyl)-fluorene,
2-butanoyloxycalciumsulfo-9,9-di-(2'-carbohexanoxyethyl)-fluorene,
2-acetoxyzincsulfo-9,9-di-(2'-carbononanoxyethyl)-fluorene,
2-heptanoyloxybariumsulfo-9-(2'-carboethoxyethyl)-9-(3'-carboethoxypropyl)-fluorene,
2-nonanoyloxystannoussulfo-9-(2'-carboethoxyethyl)-9-(3'-carbopentanoxypropyl)-fluorene,
2-butanoylbariumsulfo-9-(2'-carbomethoxyethyl)-9-(4'-carbomethoxybutyl)-fluorene,
2-octanoylstannoussulfo-9-(2'-carbopentanoxyethyl)-9-(4'-carbopentanoxybutyl)-fluorene, 2-butanoylcalciumsulfo-9-(2'-carbopropoxyethyl)-9-(6'-carbopropoxyhexyl)-fluorene,
2-acetoxyzincsulfo-9-(2'-carbomethoxyethyl)-9-(7'-carbomethoxypentyl)-fluorene,
2-acetoxycalciumsulfo-9-(2'-carbopentanoxyethyl)9-(8'-carbopentanoxyoctyl)-fluorene,
2-acetoxycalciumsulfo-9-(2'-carbomethoxyethyl)-9-(10'-carbomethoxydecyl)-fluorene,
2,7-di-(benzoyloxycalciumsulfo)-9,9-di-(2'-carboethoxyethyl)-fluorene,
2,7-di-(butanoyloxyzincsulfo)-9,9-di-(2'-carbopropoxyethyl)-fluorene,
2,7-di-(hexanoyloxystannoussulfo)-9,9-di-(2'-carbooctanoxyethyl)-fluorene,
2,7-di-(pentanoyloxymagnesiumsulfo)-9,9-di-(2'-carbopentanoxyethyl)-fluorene,
2,7-di-(acetoxyberylliumsulfo)-9-(2'-carbononanoxyethyl)-9-(3'-carbononanoxypropyl)-fluorene,
2,7-di-(octanoyloxymagnesiumsulfo)-9-(2'-carboethoxyethyl)-9-(4'-carboethoxybutyl)-fluorene,
2,7-di(pentanoyloxymanganoussulfo)-9-(2'-carbobutanoxyethyl)-9-(4'-carbobutanoxybutyl)-fluorene,
2,7-di-(pentanoyloxystrontiumsulfo)-9-(2'-carboheptanoxyethyl)-9-(5'-carboheptanoxypentyl)-fluorene,
2,7-di-(butanoyloxycalciumsulfo-9-(2'-carbodecanoxyethyl)-9-(5'-carbodecanoxypentyl)-fluorene,
2,7-di-(decanoyloxybariumsulfo)-9-(2'-carbomethoxyethyl)-9-(5'-carbomethoxypentyl)-fluorene,
2,7-di-(heptanoyloxyzincsulfo)-9-2'-carbopropoxyethyl)-9-(6'-carbopropoxyhexyl)-fluorene,
2,7-di-octanoyloxycalciumsulfo)-9-(2'-carboethoxyethyl)-9-(7'-carboethoxyheptyl)-fluorene,
2,7-di-(butanoyloxystannoussulfo)-9-(2'-carboheptanoxyethyl)-9-(8'-carboheptanoxyoctyl)-fluorene,
2,7-di-(acetoxybariumsulfo)-9-(2'-carbopropoxyethyl)-9-(9'-carbopropoxynonyl)-fluorene,
2,7-di-(propionyloxystannoussulfo)-9-(2'-carbomethoxyethyl)-9-(10'-carbomethoxydecyl)-fluorene, and the like.

Suitable diols for the production of the polyesters of this invention are the aliphatic diols represented by the general formula $HO(CH_2)_nOH$ wherein $n$ is an integer of from 2 to 10, such as ethylene glycol, trimethylene glycol, pentamethylene glycol, hexamethylene glycol, decamethylene glycol, and the like. Also suitable are 1,4-cyclohexanedimethanol, p-xylylene glycol, hydroquinone diacetate, 4-hydroxybenzyl alcohol, and the like. It is known that any glycol of an aliphatic nature, whether or not it contains aromatic nuclei, can be used in the production of linear polyesters. Thus, the term aliphatic glycols includes all those glycols of an aliphatic nature which are known to the art to be suitable.

The preferred dicarboxylic acid compounds for the production of the polyesters of this invention are the aromatic dicarboxylic acids, which are well known to those skilled in the art. The most preferred dicarboxylic acid is terephthalic acid and the dialkyl esters thereof, such as dimethyl terephthalate and similar esters in which the alkyl groups preferably contain from 1 to about 5 carbon atoms. Other suitable aromatic dicarboxylic acids or their esters which can be used are:

Isophthalic acid,
p,p'-Diphenylcarboxylic acid,
p,p'-Dicarboxydiphenyl ethane,
p,p'-Dicarboxydiphenyl hexane,
p,p'-Dicarboxydiphenyl sulfide,
p,p'-Dicarboxydiphenyl sulfone,
p,p'-Dicarboxydiphenyl ether,
p,p'-Dicarboxyphenoxy butane,
2,6-dinaphthalene dicarboxylic acid, and the like. Mixtures of two or more dicarboxylic acids can also be used. Up to about 20 percent by weight of the aromatic dicarboxylic acid can be replaced by an aliphatic acid or ester thereof, such as adipic acid, succinic acid, sebacic acid, dimethyl 1,2-eicosane dioate, and the like.

Further, linear polyesters can be produced by the self condensation of a hydroxy acid or hydroxy ester with the sulfonated fluorene modifiers, as disclosed by this invention.

Thus, the linear polyesters of this invention contain the recurring units represented by the following general formulae:

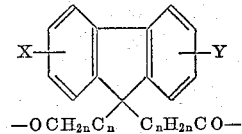

$-OCH_2C_n$ $C_nH_{2n}CO-$ from the sulfonated fluorene modifiers;

—OC-aromatic nucleus-CO— from the aromatic dicarboxylic acid compounds; and

—O-aliphatic nucleus-O— from the aliphatic glycols as defined above, wherein the recurring units are attached to one another so as to form an ester link

At least about a 1.3:1 molar ratio of glycol to dicarboxylic acid compounds is used. However, an excess of glycol to dicarboxylic acids, ranging from about 2 to 10 moles of glycol per mole of dicarboxylic acid compounds can be used. A more satisfactory ratio is from about 1.3 to 7 moles, with ratios of from about 1.5 to about 5 moles of glycol per mole of dicarboxylic acid compounds preferred.

The amount of sulfonated fluorene compound present in the modified linear polyesters of this invention can be varied from about 0.1 to about 10 mole percent or more. Amounts ranging from 0.15 to about 4 mole percent are preferred.

In producing the dyeable linear polyesters of this invention, the calculated amounts of aryl dicarboxylic acid compound, glycol, sulfonated fluorene modifier, and catalyst are charged to a reactor and heated at a temperature of from about 150° C. to about 270° C., preferably from about 170° C. to about 250° C., in an inert atmosphere to effect the initial ester interchange reaction. Then whatever excess glycol is left is removed by heating to about 280° C. at reduced pressure in an inert atmosphere or by passing a stream of an inert gas through the melt at atmospheric pressure. Thereafter the polycondensation is carried out at from about 225° C. to about 325° C., preferably from about 260° C. to about 290° C., and at reduced pressures of from about 0.1 mm. to about 20 mm. of mercury, preferably from about 0.1 mm. to about 5 mm., also in an inert atmosphere. If desired, the entire reaction can be carried out at atmospheric pressure while bubbling a stream of inert gas through the molten mixture; the rate of gas flow being increased as the polycondensation proceeds. The total reaction period can be from about one to twelve hours, according to the catalyst employed and its concentration, the temperature, the pressure, the starting monomers, the viscosity desired for the polyester, and so forth, as is known in the art.

The monomers are preferably reacted in contact with a suitable catalyst in order to shorten the reaction period and thus lessen the possibility of discoloration. Any of the well known polyesterification catalysts can be used, such as antimony oxide, zinc acetate, manganese acetate, cobaltous acetate, zinc succinate, zinc borate, magnesium methoxide, sodium methoxide, barium oxide, cadmium formate, litharge, dibutyltin oxide, tetraisopropyl titanium silicate, and the like. The concentration of the catalyst can be varied from about 0.001 percent to about 1 percent by weight of the total amount of dicarboxylic acid compounds charged. A preferred amount is from about 0.005 percent to about 0.5 percent by weight; with the most preferred amount being from about 0.01 percent to about 0.2 percent by weight.

It was unexpected that the sulfonated fluorene modifiers would have sufficient stability, both chemically and thermally, to withstand the polycondensation conditions in the presence of the other reactants, as well as the high temperatures necessary for spinning the polyesters. It was also surprising that the fibers produced from the modified polyesters of this invention showed no disadvantages in physical properties over the unmodified polyester fibers, and that they exhibited enhanced dyeability properties.

Other materials can be present in the reaction mixture, for example, color inhibitors, such as alkyl or aryl phosphite esters; or pigments, delusterants or other additives, such as titanium dioxide or barium carbonate; or viscosity stabilizers.

The reduced viscosity, $I_R$, of the polyesters of this invention is determined by the equation:

$$I_R = \frac{\Delta N}{N_0} \times \frac{1}{C}$$

wherein $\Delta N$ is the difference between the flow time of the solution and the flow time of the solvent, $N_0$ is the flow time of the solvent, and $C$ is the concentration of the polymer in grams per 100 milliliters of solution. The reduced viscosities reported in this application were obtained at a polymer concentration of 0.2 gram per 100 milliliters of solution using a 3:2 mixture of phenol and tetrachloroethane as the solvent. The reduced viscosity of the polyesters can vary from about 0.2 to about 3, with values from about 0.35 to about 1 preferred.

The fibers are dyed by conventional procedures known to the art, preferably from an aqueous solution at the boiling point of the dyebath. The cationic or basic and disperse dyestuffs are most readily absorbed, and produce deep shades. The amount of dye on a fiber, or the depth of color, is approximately proportional to the $K/S$ value which is a measure of the light reflected from the dyed sample. The larger the $K/S$ value, the deeper the shade; and a $K/S$ value of 20 is approximately twice as deep as a $K/S$ value of 10. The determination of the $K/S$ values is set forth in an article by D. B. Judd, Color in Business, Science and Industry, 1952, pages 314 through 342.

The polyesters produced by this invention can be melt spun to form filaments and yarns. Before melt spinning, the modified polyester resins were dried overnight at 90° C. at a pressure of 2 mm. mercury and then melt extruded in a plunger type spinning machine at 280° C. to 285° C. using a spinnerette having 30 holes, each 0.015 inch in diameter. The orifice velocity was 3 feet per minute and the yarn was taken up at 150 feet per minute, a draw ratio of 50:1. The yarn was then hot stretched at 90° C. around an electrically heated pin to an extent of from 200 to 500 percent, and then continuously annealed at 150° C. over an electrically heated bar, allowing 10 percent relaxation. The yarns were then woven into fabrics and dyed. The spinning procedure used is conventional for polyesters, and is well known to the skilled person in the art.

The fabrics were dyed by conventional procedures in the absence of carriers or dye assistants. The dye baths used had a liquor to fiber bath ratio of 40:1 and contained one percent of the sodium sulfate derivative of 7-ethyl-2-methyl-undecanol-4 as emulsifier. The dye concentration was 3 percent based on the weight of the fabric, and dyeings were carried out at the boil.

Among the basic and disperse dystuffs which readily dye the fibers produced from the polyesters of this invention one can mentioned the "Genacryl" dyes discussed on pages 432 to 433 of the American Dyestuff Reporter, volume 43, 1954, for example, Genacryl Red 6B (a basic dye of quaternary ammonium type), Genacryl Pink G. (Basic Red 13; Color Index No. 48015), Genacryl Blue 6G; Celliton Fast Red GGA Ex. Conc. (Disperse Red 17; Color Index No. 11210); Celliton Fast Blue AF Ex. Conc. (Color Index No. 61115); Fuchsine SBP (a basic dye of the triphenylmethane type); Fuchsine Conc. Basic Violet 14 (Color Index No. 12510); Methyl Violet 2B; Brilliant Blue 6G; Methylene Blue SP; Victoria Green WB (Color Index 657); Victoria Green (Basic Green 4; Color Index No. 42000); Rhodamine B (Color Index 749); Brilliant Green B. (Color Index 662); Sevron Brilliant Red 4G; Maxilon Red BL; Basacryl Blue GL; and the like.

Four samples of linear polyesters were used as control samples for comparative purposes. These were:

*Sample A.*—A commercially available sample of "Dacron" polyester fibers, which is a polyethylene terephthalate polyester. Fabrics of this polyester were dyed as previously described and $K/S$ values of the dyed fabrics were determined. Genacryl Pink G did not dye the fabric and the $K/S$ value was 0; Celliton Fast Red GGA Ex. Conc. gave a red shade having a $K/S$ value of 14:2; Fuchsine Conc. Basic Violet 14 and Victoria Green were both very weakly substantive having $K/S$ values of 0.2; and Celliton Fast Blue AF Ex. Conc. gave a light blue shade having a $K/S$ value of 4.0.

*Sample B.*—A mixture of 136 grams of dimethyl terephthalate, 1.37 grams of dimethyl isophthalate, 120 grams of ethylene glycol, and 0.1099 gram of calcium turnings, 0.0687 gram of zinc borate and 0.0137 gram of antimony oxide as catalyst was charged to a reactor and heated under a nitrogen atmosphere at 180° C. for 2.5 hours. The methanol formed during the reaction was removed by distillation. The temperature was then maintained at 235° C. for one hour to remove the excess glycol. The reaction mixture was then heated at 280° C. for 7.25 hours, while passing a vigorous stream of nitrogen through the melt, to carry out the polycondensation. The ethylene glycol formed during the polycondensation was removed by distillation. The polyester produced was white and it has a reduced viscosity of 0.67. A fabric dyed with Genacryl Pink G has a $K/S$ value of 0; with Celliton Fast Red GGA Ex. Conc. the $K/S$ value was 15.

*Sample C.*—A commercially available sample of "Vitel" polyester fibers, which is produced from ethylene glycol and a mixture of 90 percent dimethyl terephthalate and 10 percent of dimethyl isophthalate. Yarn dyed with Genacryl Pink G has a $K/S$ value of 0; with Celliton Fast Red GGA Ex. Conc. the $K/S$ value was 16.3.

*Sample D.*—A mixture of 120 grams of dimethyl terephthalate 6.4896 grams of 9,9-di-(2'-carbomethoxyethyl)-fluorene (3 mole percent), 120 grams of ethylene glycol, 0.0126 gram of antimony oxide, 0.0507 gram of zinc acetate, and 0.0378 gram of manganese acetate was charged to a reactor and heated under a nitrogen atmosphere at 180° C. for a period of 4.75 hours. The methanol formed during the reaction was removed by distillation. The temperature was raised to 230° C. to remove the excess glycol. The reaction mixture was then heated to 270° C. and the polycondensation was conducted at this temperature for 5.5 hours at atmospheric pressure while passing a fast stream of nitrogen through the melt. The ethylene glycol formed during the polycondensation was removed by distillation. The polyester was white and had a reduced viscosity of 0.70. A fabric dyed with Genacryl Pink G had a $K/S$ value of 0.1, indicating that it had little substantivity for the dyestuff.

The following examples further serve to define this invention but are not to be construed as limiting it thereto; parts are by weight, unless otherwise specified.

EXAMPLE 1

A mixture of 100 grams of dimethyl terephthalate, 1.3984 grams of sodium 9,9-di-(2'-carbomethoxyethyl)-fluorene-2-sulfonate (0.631 mole percent), 100 grams of ethylene glycol, 0.02 gram of antimony oxide, 0.03 gram of zinc acetate, and 0.02 gram of manganese acetate was charged to a reactor and heated at 180° C. for 4.75 hours. The methanol formed during the reaction was removed by distillation. The reaction was heated at 230° C. for one hour to distill excess glycol, and then at 280° C. for 4.5 hours to carry out the polycondensation. The ethylene glycol formed during this last heating period was removed by passing a vigorous stream of nitrogen through the reaction mixture. There was obtained a white polyester having a reduced viscosity of 0.47 and a melting point of 258° C. to 260° C. The polyester had excellent fiber- and film-forming properties. The fibers were woven into fabrics and dyed with Genacryl Pink G; the $K/S$ value was 2.4.

In a similar manner a fiber-forming polyester is produced by substituting 2-acetoxybariumsulfo-9,9-di-(2'-carbomethoxyethyl)-fluorene for sodium 9,9'-di(2'-carbomethoxyethyl)-fluorene-2-sulfonate.

EXAMPLE 2

A mixture of 100 grams of dimethyl terephthalate, 2.1084 grams of sodium 9,9-di-(2'-carbomethoxyethyl)-fluorene-2-sulfonate (0.97 mole percent), 100 grams of ethylene glycol, 0.02 gram of antimony oxide, 0.03 gram of zinc acetate, and 0.02 gram of manganese acetate was charged to a reactor and heated at 180° C. for five hours, while distilling methanol formed during the reaction. The reaction mixture was heated at 235° C. for one hour to remove excess ethylene glycol, and then at 280° C. for four and a half hours to carry out the polycondensation. The ethylene glycol formed during the polycondensation reaction was removed by distillation which was facilitated by a fast stream of nitrogen passing through the melt. The polyester had a reduced viscosity of 0.55 and a melting point of 249° C. to 251° C. It exhibited excellent fiber-forming properties. Fabrics produced from the fibers were dyed with Genacryl Pink G and had a $K/S$ value of 4.4; when dyed with Celliton Fast Red GGA Ex. Conc. the $K/S$ value was 19.9.

In a similar manner a polyester is produced by substituting 2 - propionoxymagnesiumsulfo - 9,9-di-(2'-carbomethoxyethyl)-fluorene for sodium 9,9-di-(2'-carbomethoxyethyl)-fluorene-2-sulfonate.

EXAMPLE 3

A series of polycondensations was carried out employing 1.22 mole percent (Runs A and B) and 1 mole percent (Runs C and D), based on the total amount of esters charged, of sodium 9,9-di-(2'-carbomethoxyethyl)-fluorene-2-sulfonate as modifying agent. The charges and reaction conditions are tabulated below:

| Run | A | B | C | D |
|---|---|---|---|---|
| Dimethyl terephthalate, g | 100 | 56.1 | 120 | 120 |
| Sodium 9,9-di-(2'-carbomethoxyethyl)-fluorene-2-sulfonate, g | 2.8184 | 1.5825 | 2.7456 | 2.7456 |
| Ethylene glycol, g | 100 | 60 | 120 | 120 |
| Antimony oxide, g | 0.02 | 0.0115 | 0.0245 | 0.0245 |
| Zinc acetate, g | 0.03 | 0.0173 | 0.0368 | 0.0368 |
| Manganese acetate, g | 0.02 | 0.0115 | 0.0245 | 0.0245 |
| Ester exchange: | | | | |
| Time, hrs | 5.5 | 6.5 | 4 | 4.5 |
| Temp., ° C | 180 | 180 | 180 | 180 |
| Excess glycol removal: | | | | |
| Time, hrs | 1 | 0.75 | 1.25 | 0.75 |
| Temp., ° C | 230 | 235 | 235 | 180–270 |
| Polycondensation: | | | | |
| Time, hrs | 3 | 4.5 | 4.75 | 4.5 |
| Temp., ° C | 280 | 270 | 280 | 270 |
| Reduced viscosity | 0.56 | 0.59 | 0.76 | 0.63 |
| Melting point, ° C | 247–9 | 246–8 | 249–51 | 257–9 |

The polyesters were spun into fibers and woven. The fabrics produced were dyed with Genacryl Pink G (I) and Celliton Fast Red GGA Ex. Conc. (II) and the $K/S$ values determined:

$K/S$ values

| Run | A | B | C |
|---|---|---|---|
| Dyestuff I | 10.9 | 8.1 | 7.4 |
| Dyestuff II | 20.8 | 20.8 | 20.8 |

EXAMPLE 4

A mixture of 170 grams of dimethyl terephthalate, 5.4560 grams of sodium 9,9-di-(2'-carbomethoxyethyl)-fluorene-2-sulfonate (1.4 mole percent), 175 grams of ethylene glycol, 0.0351 gram of antimony oxide, 0.0526 gram of zinc acetate, and 0.0351 gram of manganese acetate was charged to a reactor and heated at 180° C. to 195° C. for 3.75 hours, while distilling methanol formed during the reaction. Then the reaction mixture was heated from 180 to 270° C. for 1.25 hours to remove excess ethylene glycol, and finally at 270° C. for four and a half hours to carry out the polycondensation. Throughout the whole reaction, a stream of nitrogen was passed through the melt. There was obtained a white polyester having a reduced viscosity of 0.55 and a melting point of 258° C. to 260° C. The polymer was characterized by excellent fiber- and film-forming properties. Fabric produced from the fibers was dyed with Genacryl Pink G and had a $K/S$ value of 6.3; when dyed with Celliton Fast Red GGA Ex. Conc. the $K/S$ value was 19.0.

In a similar manner a fiber-forming polyester is produced by substituting 2-acetoxyzincsulfo-9,9-di-(2'-carbomethoxyethyl)-fluorene for sodium 9,9-di-(2'-carbomethoxyethyl)-fluorene-2-sulfonate.

EXAMPLE 5

Two polycondensations were carried out employing 1.5 mole percent, based on the total amount of esters charged, of sodium 9,9-di-(2'-carbomethoxyethyl)-fluorene-2-sulfonate as modifying agent. The charges and reaction conditions are tabulated below:

| Run | A | B |
|---|---|---|
| Dimethyl terephthalate | 120 | 170 |
| Sodium 9,9-di-(2'-carbomethoxyethyl)-fluorene-2-sulfonate, g | 4.1450 | 5.8696 |
| Ethylene glycol, g | 120 | 175 |
| Antimony oxide, g | 0.0248 | 0.0352 |
| Zinc acetate, g | 0.0372 | 0.0528 |
| Manganese acetate, g | 0.0248 | 0.0352 |
| Ester exchange: | | |
| Time, hrs | 4 | 4.5 |
| Temp., ° C | 180 | 180 |
| Excess glycol removal: | | |
| Time, hrs | 1.25 | 1 |
| Temp., ° C | 235 | 180–270 |
| Polycondensation: | | |
| Time, hrs | 4.75 | 5 |
| Temp., ° C | 285 | 270 |
| Reduced viscosity | 0.70 | 0.65 |
| Melting point, ° C | 250–2 | 254–6 |

The polyesters were spun into fibers and woven. The fabrics were dyed with Genacryl Pink G (I) and Celliton Fast Red GGA Ex. Conc. (II) and the $K/S$ values determined:

$K/S$ values

| Run | A | B |
|---|---|---|
| Dyestuff I | 20.8 | 11.8 |
| Dyestuff II | 25.3 | 25.3 |

EXAMPLE 6

A mixture of 170 grams of dimethyl terephthalate, 6.2480 grams of sodium 9,9-di-(2'-carbomethoxyethyl)-fluorene-2-sulfonate (1.6 mole percent), 1.75 grams of ethylene glycol, 0.0351 gram of antimony oxide, 0.0527 gram of zinc acetate, and 0.0351 gram of manganese acetate was charged to a reactor and heated at 180° C. to 195° C. for 3.5 hours, while distilling methanol formed during the reaction. Then the reaction mixture was heated from 195° C. to 270° C. for one hour to remove excess ethylene glycol. The polycondensation was carried out at 270° C. for 3.66 hours at atmospheric pressure while passing a fast stream of nitrogen through the melt. There was obtained a white polyester having a reduced viscosity of 0.61 and a melting point of 259 to 261° C. The resin showed good fiber-forming and cold-drawing properties. Fabric produced from the fibers was dyed with Genacryl Pink G and had a $K/S$ value of 9.7; when dyed with Celliton Fast Red GGA Ex. Conc. the $K/S$ value was 19.

In a similar manner a polyester is produced by substituting 2 - acetoxycalciumsulfo-9,9-di-(2'-carbomethoxyethyl)-fluorene for sodium 9,9-di-(2'-carbomethoxyethyl)-fluorene-2-sulfonate.

EXAMPLE 7

A mixture of 170 grams of dimethyl terephthalate, 6.8640 grams of sodium 9,9-di-(2'-carbomethoxyethyl)-fluorene-2-sulfonate (1.75 mole percent), 175 grams of ethylene glycol, 0.0354 gram of antimony oxide, 0.0530 gram of zinc acetate, and 0.0354 gram of manganese acetate was charged to a reactor and heated at 180° C. for 4.5 hours, while distilling methanol formed during the reaction. The reaction mixture was heated from 180° C. to 270° C. for 1 hour to remove excess ethylene glycol, and then at 270° C. for 5 hours at atmospheric pressure while passing a vigorous stream of nitrogen through the melt to bring about the polycondensation. There was obtained a white polyester having a reduced viscosity of 0.62 and a melting point of 253° C. to 255° C.

The polyester was spun into fibers and fabrics were woven therefrom. The fabrics were dyed and the $K/S$ values determined are tabulated below:

| | |
|---|---|
| Genacryl Pink G | 21.7 |
| Celliton Fast Red GGA Ex. Conc. | 20.8 |
| Fuchsine Conc. Basic Violet 14 | 19.0 |
| Victoria Green | 21.7 |
| Celliton Fast Blue AF Ex. Conc. | 16.9 |

In a similar manner a fiber-forming polyester is obtained by substituting 2 - butanoyloxystannoussulfo - 9,9-di-(2'-carbomethoxyethyl)-fluorene for sodium 9,9-di-(2'-carbomethoxyethyl)-fluorene-2-sulfonate.

EXAMPLE 8

A mixture of 70 grams of dimethyl terephthalate, 4 grams of sodium 9,9-di-(2'-carbomethoxyethyl)-fluorene-2-sulfonate (2.4 mole percent), 80 grams of ethylene glycol, 0.0148 gram of antimony oxide, 0.0222 gram of zinc acetate, and 0.0148 gram of manganese acetate was charged to a reactor and heated at 180° C. to 190° C. for 4.5 hours, while distilling methanol formed during the reaction. The reaction mixture was heated at 235° C. for 0.75 hour to remove excess ethylene glycol, and then at 260° C. to 285° C. for 5 hours at atmospheric pressure while passing a vigorous stream of nitrogen through the melt to carry out the polycondensation. There was obtained a white polyester having a reduced viscosity of 0.54 and a melting point of 248° C. to 250° C.

In a similar manner a polyester is produced by substituting 2 - acetoxyberylliumsulfo-9,9-di-(2'-carbomethoxyethyl)-fluorene for sodium 9,9-di-(2'-carbomethoxyethyl)-fluorene-2-sulfonate.

EXAMPLE 9

A polycondensation was carried out employing 2.5 mole percent, based on the total amount of esters charged, of sodium 9,9 - di - (2'-carbomethoxyethyl)-fluorene-2-sulfonate as modifying agent. The materials charged and reaction conditions are tabulated below:

| | | |
|---|---|---|
| Dimethyl terephthalate | g | 120 |
| Sodium 9,9-di-(2'-carbomethoxyethyl)-fluorene-2-sulfonate | g | 6.9520 |
| Ethylene glycol | g | 120 |
| Antimony oxide | g | 0.0254 |
| Zinc acetate | g | 0.0254 |
| Manganese acetate | g | 0.0381 |
| Ester exchange: | | |
| Time | hrs | 5.5 |
| Temp. | ° C | 180 |
| Excess glycol removal: | | |
| Time | hrs | 0.75 |
| Temp. | ° C | 180–270 |
| Polycondensation: | | |
| Time | hrs | 5 |
| Temp. | ° C | 270 |
| Reduced viscosity | | 0.63 |
| Melting point | ° C | 244–6 |

Fibers produced from this polyester were woven into fabrics and dyed. When dyed with Genacryl Pink G the $K/S$ value was 21.7; and when dyed with Celliton Fast Red GGA Ex. Conc. the $K/S$ value was 24.

EXAMPLE 10

A mixture of 120 grams of dimethyl terephthalate, 8.404 grams of sodium 9,9-di-(2'-carbomethoxyethyl)-fluorene-2-sulfonate (3 mole percent), 120 grams of ethylene glycol, 0.0257 gram of antimony oxide, 0.0385 gram of zinc acetate, and 0.0257 gram of manganese acetate was charged to a reactor and heated at 180° C. for five hours, while distilling methanol formed during the reaction. The reaction mixture was heated from 180° C. to 270° C. over a period of 0.75 hour to remove excess ethylene glycol, and then at 270° C. for 5 hours at atmospheric pressure to carry out the polycondensation. During the whole operation, nitrogen was passed through the melt. There was obtained a white polyester having a reduced viscosity of 0.54 and a melting point of 244° C. to 246° C. The polyester was readily spun into fibers and fabrics were woven therefrom. When dyed with Genacryl Pink G the $K/S$ value was 21.7; and when dyed with Celliton Fast Red GGA Ex. Conc. the $K/S$ value was 23.5.

In a similar manner a fiber-forming polyester is produced by substituting 2-acetoxystrontiumsulfo-9,9-di-(2'-carbomethoxyethyl)-fluorene for sodium 9,9-di-(2'-carbomethoxyethyl)-fluorene-2-sulfonate.

EXAMPLE 11

A mixture of 30 grams of dimethyl terephthalate, 3.577 grams of sodium 9,9-di-(2'-carbomethoxyethyl)-fluorene-2-sulfonate (5 mole percent), 30 grams of ethylene glycol, 0.0101 gram of antimony oxide, and 0.0151 gram of zinc acetate was charged to a reactor and heated at 180° C. for 2.75 hours, while distilling methanol formed during the reaction. The reaction mixture was then heated to 270° C. over a period of 1.75 hours to remove excess ethylene glycol, and kept at 270° C. for 3 hours at a pressure of 3 mm. of mercury in a nitrogen atmosphere to carry out the polycondensation. The polyester produced had a reduced viscosity of 0.33 and a melting point of 232° C. to 237° C. The resin had excellent fiber- and film-forming properties.

EXAMPLE 12

A mixture of 120 grams of dimethyl terephthalate, 2.531 grams of disodium 9,9-di-(2'-carbomethoxyethyl)-fluorene-2,7-disulfonate (0.75 mole percent), 120 grams of ethylene glycol, 0.0245 gram of antimony oxide, 0.0367 gram of zinc acetate, and 0.0245 gram of manganese acetate was charged to a reactor and heated at 180° C. for 4.75 hours, while distilling methanol formed during the reaction. The reaction mixture was then heated to 280° C. over a period of 0.75 hour to remove excess ethylene glycol, and then at 290° C. to 295° C. for 7 hours at atmospheric pressure to carry out the polycondensation. Throughout the entire reaction a nitrogen atmosphere was maintained in the reactor. There was obtained a polyester having a reduced viscosity of 0.66 and a melting point of 257° C. to 259° C. The polyester was extruded into fibers which could be cold drawn from five to six fold.

In a similar manner a fiber-forming polyester is produced by substituting 2,7-di-(acetoxybariumsulfo)-9,9-di-(2'-carbomethoxyethyl)-fluorene for disodium 9,9-di-(2'-carbomethoxyethyl)-fluorene-2,7-disulfonate.

EXAMPLE 13

A mixture of 120 grams of dimethyl terephthalate, 3.386 grams of disodium 9,9-di-(2'-carbomethoxyethyl)-fluorene-2,7-disulfonate (1 mole percent), 120 grams of ethylene glycol, 0.0247 gram of antimony oxide, 0.037 gram of zinc acetate, and 0.0247 gram of manganese acetate was heated at 180° C. to 200° C. for 5.75 hours, while distilling methanol formed during the reaction. The reaction mixture was then heated to 280° C. over a period of 1.25 hours to remove excess ethylene glycol, and then at 280° C. to 300° C. for 4.5 hours at atmospheric pressure to carry out the polycondensation. Throughout the entire reaction nitrogen was bubbled through the reaction mixture. There was obtained a white polyester having a reduced viscosity of 0.70 and a melting point of 258° C. to 260° C. The polyester had excellent fiber-forming properties.

In a similar manner a polyester is produced by substituting 2,7-di-(acetoxymagnesiumsulfo)-9,9-di-(2'-carbomethoxyethyl)-fluorene for disodium 9,9-di-(2'-carbomethoxyethyl)-fluorene-2,7-disulfonate.

EXAMPLE 14

A mixture of 120 grams of dimethyl terephthalate, 4.228 grams of disodium 9,9-di-(2'-carbomethoxyethyl)-fluorene-2,7-disulfonate (1.25 mole percent), 120 grams of ethylene glycol, 0.0248 gram of antimony oxide, 0.0273 gram of zinc acetate, and 0.0248 gram of manganese acetate was heated at 180° C. for 4.75 hours, while distilling methanol formed during the reaction. The reaction mixture was then heated to 280° C. over a period of 0.66 hour to remove excess ethylene glycol, and then at 290° C. to 295° C. for 5.7 hours at atmospheric pressure to carry out the polycondensation. Throughout the entire reaction nitrogen was bubbled through the reaction mixture. There was obtained a polyester having a reduced viscosity of 0.64 and a melting point of 258° C. to 260° C., which had excellent fiber-forming properties.

In a similar manner a polyester is produced by substituting 2,7 - di-(propionoxycalciumsulfo)-9,9-di-(2'-carbomethoxyethyl)-fluorene for disodium 9,9-di-(2'-carbomethoxyethyl)-fluorene-2,7-disulfonate.

EXAMPLE 15

A mixture of 120 grams of dimethyl terephthalate, 5.095 grams of disodium 9,9-di-(2'-carbomethoxyethyl)-fluorene-2,7-disulfonate (1.5 mole percent), 120 grams of ethylene glycol, 0.025 gram of antimony oxide, 0.0375 gram of zinc acetate, and 0.025 gram of manganese acetate was heated at 180° C. for 5.25 hours, while distilling methanol formed during the reaction. The reaction mixture was then heated to 280° C. over a period of 0.5 hour to remove excess ethylene glycol, and then at 290° C. to 295° C. for 6.25 hours at atmospheric pressure to carry out the polycondensation. Throughout the entire reaction nitrogen was bubbled through the reaction mixture. There was obtained a polyester having a reduced viscosity of 0.60 and a melting point of 253° C. to 255° C.

In a similar manner a fiber-forming polyester is produced by substituting 2,7-di-(acetoxyzincsulfo)-9,9-di-(2'-carbomethoxyethyl)-fluorene for disodium 9,9-di-(2'-carbomethoxyethyl)-fluorene-2,7-disulfonate.

EXAMPLE 16

A mixture of 194 grams of dimethyl terephthalate, 4.831 grams of dilithium 9,9-di-(2'-carbomethoxyethyl)-fluorene-2,7-disulfonate (1 mole percent), 180 grams of ethylene glycol, 0.02 gram of antimony oxide, and 0.09 gram of zinc acetate was charged to a reactor and heated at 183° C. to 186° C. for 8 hours, while distilling methanol formed during the reaction. Then the reaction mixture was heated at 265° C. to 270° C. for 2.25 hours to remove excess ethylene glycol. The polycondensation was carried out at 272° C. to 274° C. for 4.75 hours at atmospheric pressure while passing a fast stream of nitrogen through the melt. A white, crystalline, fiber-forming polyester was obtained which had a reduced viscosity of 0.64 and melted at 257° C. to 261° C.

In a similar manner a fiber-forming polyester is produced by substituting 2,7-di-(acetoxyberylliumsulfo)-9,9-di-(2'-carbomethoxymethyl)-fluorene for dilithium 9,9-di-(2'-carbomethoxyethyl)-fluorene-2,7-disulfonate.

EXAMPLE 17

A mixture of 194 grams of dimethyl terephthalate, 4.4583 grams of lithium 9,9-di-(2'-carbomethoxyethyl)-fluorene-2-sulfonate (1 mole percent), 180 grams of ethylene glycol, 0.02 gram of antimony oxide, and 0.09 gram of zinc acetate was charged to a reactor and heated for 4.25 hours at 185° C. to 189° C., while distilling methanol formed during the reaction. Then, the reaction mixture was heated at 220° C. to 267° C. for 2.75 hours to remove the excess ethylene glycol. The polycondensation was conducted at 265° C. to 275° C. for 4.2 hours at atmospheric pressure while passing a vigorous stream of nitrogen through the melt. A white, crystalline, fiber-forming polyester was obtained which had a reduced viscosity of 0.55 and melted at 251° C. to 254° C. Fibers melt-spun from this resin were woven and dyed with Genacryl Pink G to a bright shade having a K/S value of 6.7 and with Celliton Fast Red GGA Ex. Conc. to a deep shade having a K/S value of 21.7.

EXAMPLE 18

A mixture of 150 grams of dimethyl terephthalate, 6.2746 grams of potassium 9,9-di-(2'-carbomethoxyethyl)-fluorene-2-sulfonate (1.75 mole percent), 150 grams of ethylene glycol, 0.0156 gram of antimony oxide, and 0.0703 gram of zinc acetate was charged to a reactor and heated at 180° C. to 195° C. for 3 hours, while distilling methanol formed during the reaction. Then, the reaction mixture was heated from 195° C. to 235° C. over a period of 0.25 hour to remove the ethylene glycol excess. The polycondensation was conducted at 265° C. for 4.25 hours at atmospheric pressure while passing a fast stream of nitrogen through the melt. The white, crystalline polyester obtained had excellent fiber-forming and cold-stretching properties (400 percent). Its melting point was 256° C. to 258° C. and its reduced viscosity was 0.52. Fibers obtained by melt-spinning this resin were dyed with Genacryl Pink 6 to a medium-deep shade having a K/S value of 13.3 and with Celliton Fast Red GGA Ex. Conc. to a deep red shade having a K/S value of 20.75.

EXAMPLE 19

A mixture of 150 grams of dimethyl terephthalate, 7.1947 grams of potassium 9,9-(2'-carbomethoxyethyl)-fluorene-2-sulfonate (2 mole percent), 150 grams of ethylene glycol, 0.0157 gram of antimony oxide, and 0.0707 gram of zinc acetate was charged to a reactor and heated for 6 hours at 180° C. to 195° C., while distilling methanol formed during the reaction. The mixture was heated over a period of 15 minutes to 235° C. to remove the excess ethylene glycol. The polycondensation was conducted at 265° C. to 270° C. for 4.5 hours at atmospheric pressure while passing nitrogen through the melt. The polyester obtained was white and had excellent fiber-forming and cold-drawing properties. The resin melted at 257° C. to 259° C. and had a reduced viscosity of 0.56. Fibers obtained by melt-spinning this resin were dyed with Genacryl Pink G to a deep shade having a K/S value of 21.74 and with Celliton Fast Red GGA Ex.

Conc. to a very deep red shade having a K/S value of 19.85.

EXAMPLE 20

A mixture of 194 grams of dimethyl terephthalate, 9.8 grams of methyl 4-[2-sodiumsulfo-9-(2'-carbomethoxy)-fluoren-9-yl]hexanoate (2 mole percent), 180 grams of ethylene glycol, 0.02 gram of antimony oxide, and 0.09 gram of zinc acetate was charged to a reactor and heated at 180° C. to 187° C. for 5.25 hours, while distilling methanol formed during the reaction. Then, the reaction mixture was heated for 3 hours at 231° C. to 238° C. to remove the ethylene glycol excess. The polycondensation was carried out at 265° C. to 279° C. for 4.5 hours at atmospheric pressure while passing a fast stream of nitrogen through the melt. A fiber-forming polyester was obtained which had a reduced viscosity of 0.6.

EXAMPLE 21

A mixture of 19.4 grams of dimethyl terephthalate, 0.91 gram of the bis-(2-methylpentyl) ester of potassium 9,9-di-(2'-carboxyethyl)-fluorene-2-sulfonate (1.5 mole percent), 20 grams of ethylene glycol, 0.002 gram of antimony oxide, and 0.009 gram of zinc acetate was charged to a reactor and heated at 188° C. to 199° C. for 4 hours, while distilling methanol and 2-methylpentanol formed during the reaction. Then the reaction mixture was heated at about 230° C. for 2.5 hours to distill out the excess ethylene glycol. The polycondensation was carried out between 260° C. and 269° C. for about 4 hours at atmospheric pressure while passing a fast stream of nitrogen through the melt. A crystalline polyester which was fiber-forming and cold-drawable was obtained. It had a reduced viscosity of 0.45 and melted at 255° C. to 256° C.

EXAMPLE 22

A mixture of 175 grams of dimethyl terephthalate, 5.47 grams of dimethyl isophthalate (3 mol percent), 4.28 grams of lithium 9,9-di-(2'-carbomethoxyethyl)-fluorene-sulfonate (1 mole percent), 180 grams of ethylene glycol, 0.018 gram of antimony oxide, and 0.081 gram of zinc acetate was charged to a reactor and heated at 185° C. to 186° C. for 5 hours, while distilling methanol formed during the reaction. Then the reaction mixture was heated for 3.5 hours at 265° C. to remove the ethylene glycol excess. The polycondensation was carried out for 4 hours at 265° C. to 267° C. at atmospheric pressure while passing a fast stream of nitrogen through the melt. The white crystalline polyester was obtained which had a reduced viscosity of 0.58 and melted at 243° C. to 245° C. Fibers obtained from this polyester by melt-spinning were dyed with Genacryl Pink G to a medium shade having a K/S value of 10.1 and with Celliton Fast Red GGA Ex. Conc. to a deep shade having a K/S value of 20.8.

EXAMPLE 23

A mixture of 155 grams of dimethyl terephthalate, 4.74 grams of disodium 9-(2'-carbomethoxyethyl)-9-(5'-carbomethoxypentyl)-fluorene-2,7-disulfonate (1 mole percent), 150 grams of ethylene glycol, 0.016 gram of antimony oxide, and 0.072 gram of zinc acetate was charged to a reactor and heated at 176° C. to 187° C. for 4.25 hours, while distilling methanol formed during the reaction. Then the reaction mixture was heated at 235° C. to 275° C. for 1.5 hours to distill out the ethylene glycol excess. The polycondensation was carried out at 275° C. for 5.25 hours at atmospheric pressure while passing a fast stream of nitrogen through the melt. A fiber-forming, crystalline polyester was obtained which had a reduced viscosity of 0.58 and melted at 267° C.

EXAMPLE 24

A mixture of 15 grams of dimethyl terephthalate, 0.7191 gram of potassium 9,9-di-(2'-carbomethoxyethyl)-fluorene-2-sulfonate (2 mole percent), 35 grams of 1,4-cyclohexanedimethanol (50 grams of a 70 percent methanol solution), 0.0016 gram of antimony oxide, and 0.0071 gram of zinc acetate was charged to a reactor and heated at 195° C. to 206° C. for 3.75 hours, while distilling methanol formed during the reaction. Then the reaction mixture was heated at 245° C. to 250° C. for 2.25 hours to remove the excess glycol. A fast stream of nitrogen facilitated the distillation of the glycol. The polycondensation was carried out at 295° C. to 300° C. for 6.5 hours at atmospheric pressure while passing a fast stream of nitrogen through the melt. A solid polyester was obtained.

The sulfonated fluorenes used in this invention to produce the dyeable, linear polyesters can also be employed with known benzene sulfonate chain terminators, for example, methyl 3-sodiumsulfobenzoate and methyl 4-sodiumsulfobenzoate, to produce polyester yarns having unexpectedly superior dyeing properties, as is shown in the following examples.

EXAMPLE 25

A series of polycondensations was carried out to produce polyesters in the presence of a sulfonated chain terminator and in the absence of sulfonated fluorene modifiers as controls for comparison purposes with the polyesters of control Samples A to D and of Example 26. For convenience, the charges and results are tabulated below:

| Run | A | B | C | D |
|---|---|---|---|---|
| Dimethyl terephthalate, g | 150 | 174 | 150 | 194 |
| Methyl 3-sodiumsulfobenzoate, g | 2.3562 | 3.3320 | | |
| Methyl 4-sodiumsulfobenzoate, g | | | 4.2080 | 4.0222 |
| Ethylene glycol, g | 150 | 180 | 150 | 200 |
| Antimony oxide, g | 0.0457 | 0.0355 | 0.0308 | 0.0396 |
| Zinc acetate, g | 0.0685 | 0.0532 | 0.0463 | 0.0592 |
| Manganese acetate, g | | 0.0355 | 0.0308 | 0.0396 |
| Ester exchange: | | | | |
|   Time, hrs | 4.5 | 4.5 | 4.5 | 4.75 |
|   Temp., ° C | 180 | 180 | 180 | 180 |
| Excess glycol removal: | | | | |
|   Time, hrs | 1 | 1 | 1 | 1 |
|   Temp., ° C | 180–208 | 180–270 | 180–280 | 180–280 |
| Polycondensation: | | | | |
|   Time, hrs | 1 | 1 | 1 | 1 |
|   Temp., ° C | 280 | 270 | 280 | 280 |
| Reduced viscosity | 0.56 | 0.57 | 0.61 | 0.71 |
| Melting point, ° C | 257–259 | 251–253 | 254–256 | 249–251 |
| K/S values with: | | | | |
|   Genacryl Pink G | | 7.3 | 2.9 | |
|   Celliton Fast Red GGA Ex. Conc | | | 12.9 | 3.3 |

EXAMPLE 26

A series of polycondensations was carried out using both a chain terminator and the modifier 9,9-di-(2'-carbomethoxyethyl)-fluorene-2-sulfonic acid for comparison with the polyesters of Example 25. The experiments are tabulated below:

| Run | A | B | C | D |
|---|---|---|---|---|
| Dimethyl terephthalate, g | 194 | 181.3 | 172.3 | 176.8 |
| Sodium dimethyl 9,9-di-(2'-carbomethoxyethyl)-fluorene-2-sulfonate, g | 3.5464 | 4.1536 | 3.9468 | 4.0480 |
| Methyl 3-sodiumsulfobenzoate, g | | | 3.3320 | 2.8560 |
| Methyl 4-sodiumsulfobenzoate, g | 4.5696 | 3.8080 | | |
| Ethylene glycol, g | 200 | 184 | 180 | 180 |
| Antimony oxide, g | 0.0404 | 0.0378 | 0.0359 | 0.0367 |
| Zinc acetate, g | 0.0606 | 0.0568 | 0.0539 | 0.0551 |
| Manganese acetate, g | 0.0404 | 0.0378 | 0.0359 | 0.0367 |
| Ester exchange: | | | | |
|   Time, hrs | 6.5 | 3.75 | 4.25 | 4.5 |
|   Temp., ° C | 180 | 180 | 180 | 180 |
| Excess glycol removal: | | | | |
|   Time, hrs | 1 | 1 | 1 | 1 |
|   Temp., ° C | 180–270 | 235–270 | 180–270 | 180–270 |
| Polycondensation: | | | | |
|   Time, hrs | 6.5 | 6.25 | 6 | 6 |
|   Temp., ° C | 270 | 275 | 270 | 270 |
| Reduced viscosity | 0.54 | 0.58 | 0.50 | 0.53 |
| Melting point, ° C | 246–8 | 258–60 | 251–3 | 250–2 |
| K/S values with: | | | | |
|   Genacryl Pink G | 12.2 | 11.2 | 19.8 | 11.8 |
|   Celliton Fast Red GGA Ex. Conc | 22.0 | 20.7 | 25.3 | 20.8 |

As indicated by the K/S values, the presence of chain terminator alone shows some improvement in dyeability. However, this improvement was not as great as is obtained when the polyester is produced using a sulfonated fluorene modifier. Further, when a combination of sulfonated chain terminator and sulfonated fluorene modifier is used, a smaller total amount of modifiers is necessary than when using either sulfonated compound alone. Thus, it was also found that a combination of about 1.2 to about 1.6 mole percent of methyl 3-sodiumsulfobenzoate and about 0.5 mole percent of sodium 9,9-di-(2'-carbomethoxyethyl)-fluorene-2-sulfonate gave as deep a shade as was obtained with 2 to 3 mole percent of sodium 9,9-di-(2'-carbomethoxyethyl)-fluorene-2-sulfonate alone without the benzene sulfonate chain stopper.

The following experiments illustrate the preparation of some of the sulfonated fluorene modifiers used to produce the modified polyesters of this invention. Similar procedures were used to produce the others.

EXPERIMENT 1

A mixture of 46 grams of 9,9-di-(2'-carboxyethyl)-fluorene-2,7-disulfonic acid and 400 milliliters of methanol was heated at reflux for 5 hours, and then cooled. From a small poriton of the reaction mixture 9,9-di-(2'-carbomethoxyethyl)-fluorene-2,7-disulfonic acid is recovered. The remainder of the reaction mixture was reacted with methanolic sodium hydroxide to a pH of 7.5 and a precipitate formed. The precipitate was filtered; the filtrate was concentrated on a steam bath, and on cooling a second crop of crystals was obtained and filtered. The two crystal fractions were combined and recrystallized from methanol to give the pure disodium 9,9-di-(2'-carbomethoxyethyl) - fluorene - 2,7 - disulfonate crystals, which were stable up to 340° C. The disulfonate was characterized by infrared analysis and elemental analysis. Calculated for $C_{21}H_{20}O_{10}SNa_2$: C, 46.49; H, 3.78; S, 11.82. Found: C, 45.95; H, 3.82; S, 11.83.

In a similar manner 9,9-di-(2'-carbopentanoxyethyl)-fluorene-2,7-disulfonic acid is produced by esterifying 9,9-di-(2'-carboxyethyl)-fluorene-2,7-disulfonic acid with pentanol. From this ester the dipotassium, dilithium and dicesium salts are prepared by reaction with the appropriate hydroxide using the same procedure described above.

Heating a mixture of tin acetate and 9,9-di-(2'-carbomethoxyethyl)-fluorene-2,7-disulfonic acid in methanol at the reflux temperature produces 2,7-di-(acetoxytinsulfo)-9,9-di-(2'-carbomethoxyethyl)-fluorene.

EXPERIMENT 2

A warm solution of 448 grams of 9,9-di-(2'-carbomethoxyethyl)-fluorene-2-sulfonic acid dissolved in 1 liter of warm methanol was reacted with a methanolic potassium hydroxide solution to a pH of 7.1. On cooling potassium 9,9 - di-(2'-carbomethoxyethyl)-fluorene-2-sulfonate crystallized and was filtered. After two recrystallizations from methanol, the white crystals melted at 203° C. to 204° C.

Heating a mixture of strontium acetate and 9,9-di-(2'-carbomethoxyethyl)-fluorene-2-sulfonic acid in methanol at the reflux temperature produces 2-acetoxystrontiumsulfo-9,9-di-(2'-carbomethoxyethyl)-fluorene.

EXPERIMENT 3

There was charged to a glass reaction flask equipped with a reflux condenser and thermometer, 49 grams of potassium 9,9-di-(2'-carbomethoxyethyl) - fluorene-2-sulfonate, 150 milliliters of 2-methylpentanol, and 1 drop of tetraisopropyltitanate. The solution was heated at reflux for 7 hours and the excess 2-methylpentanol was distilled under reduced pressure on a steam bath to leave a tacky semi-solid residue in the flask. The residue was dissolved in 200 milliliters of hot acetone, and the solution was filtered hot to remove a trace of insoluble material. After evaporation of the solvent on a steam bath, the bis-(2-methylpentyl) ester of potassium 9,9-di-(2'-carboxyethyl)-fluorene-2-sulfonate obtained was dried at 115° C. at 2 mm. pressure to yield a white solid.

EXPERIMENT 4

A 14 gram portion of concentrated sulfuric acid (98 percent) was slowly added at −10 to 0° C. to 27 grams of acetic anhydride with agitation. A solution of 50 grams of 9-(2'-carbomethoxyethyl)-9-(5'-carbomethoxypentyl)-fluorene dissolved in 75 milliliters of ethylene dichloride was then added dropwise to the cold solution. The temperature of the solution was maintained at 0 to 10° C. for 4 hours, warming to 25° C. over a period of 2 hours, and then heated to 40° C. during 1 hour. After cooling the solution to 30° C., 150 milliliters of methanol was added in a dropwise manner and the solution was refluxed for 4½ hours. The formed methyl acetate and ethylene dichloride-methanol azeotrope were distilled from the flask and replaced with fresh methanol during the distillation. Then the methanol solution was reacted with methanolic sodium hydroxide to a pH of 7.1 and the solvent was evaporated on a steam bath to give a viscous residue. The residue was recrystallized twice from acetonitrile and dried to yield crystals of sodium 9-(2' - carbomethoxyethyl) - 9 - (5'-carbomethoxypentyl)-fluorene-2-sulfonate which melted at 95° C. to 100° C.

EXPERIMENT 5

A mixture of 96 grams of 9,9-di-(2'-carbomethoxyethyl)-fluorene-2,7-disulfonic acid was heated at reflux in 500 milliliters of methanol for 8 hours, distilling most of the methanol and replacing the new methanol once. The solution was reacted with methanolic lithium hydroxide to a pH of 7.0 and the clear solution was evaporated on a steam bath to yield a clear viscous residue. After dissolving the residue in 150 milliliters of methanol, the solution was poured into 1 liter of ether and the precipitated solid, dilithium 9,9 - di - (2' - carbomethoxyethyl)-fluorene-2,7-disulfonate was filtered. The crystals were dried at 100° C. at 1 mm. pressure and did not melt at 400° C.

EXPERIMENT 6

There was charged to a glass reaction flask equipped with an air condenser, thermometer, and stopper, 26 grams of 9-(2'-carboxyethyl)-9-(5'-carboxypentyl)-fluorene, 100 grams of sulfuric acid, and 0.2 gram of mercuric sulfate. The reaction mixture was heated at 100° C. for 8 hours, cooled to room temperature, and then poured onto 60 grams of ice. No solid crystallized on standing for several days and the solution was neutralized with methanolic sodium hydroxide, precipitating sodium sulfate. After filtering off the solid sodium sulfate, the solution was evaporated on the steam bath. The residue was dissolved in 200 milliliters of methanol and heated at reflux for 6 hours, distilling the methanol and replacing with fresh methanol. Approximately one half of the methanol solution was reacted with methanolic sodium hydroxide to a pH of 7.0 but no solid crystallized on cooling. The methanol was evaporated on a steam bath to give a viscous residue which slowly crystallized on standing. After dissolving the residue in 150 milliliters of warm methanol and treating the solution with charcoal and filtering, the solution was added dropwise to 300 milliliters of boiling dioxane, distilling the methanol and precipitating the white crystalline disodium 9-(2'-carbomethoxyethyl) - 9 - (5' - carbomethoxypentyl) - fluorene - 2,7 - disulfonate. After cooling the white crystals were recovered by filtration and dried.

Heating a mixture of barium acetate and 9-(2'-carbomethoxyethyl) - 9 - (5' - carbomethoxypentyl) - fluorene-2,7-disulfonic acid in methanol at the reflux temperature produces 2,7-di-(acetoxybariumsulfo) - 9 - (2' - carbomethoxyethyl)-9-(5'-carbomethoxypentyl)-fluorene.

What is claimed is:
1. A linear polyester consisting of the condensation product of (1) an aliphatic glycol containing from 2 to 10 carbon atoms, (2) from 0.1 to about 10 mole percent, based on the total amount of dicarboxylic acid compounds present, of a sulfonated fluorene compound represented by the formula:

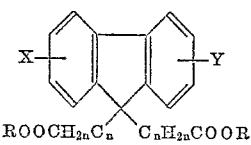

$ROOCH_{2n}C_n$    $C_nH_{2n}COOR$ wherein X is a member selected from the group consisting of X' and X" groups; X' is a member selected from the group consisting of a hydrogen atom and a Y' group wherein Y' is a member selected from the group consisting of an —$SO_3H$ group and an —$SO_3M$ group in which M is a member selected from the group consisting of lithium, sodium, potassium, rubidium, and cesium; X" is a member selected from the group consisting of a hydrogen atom and an —$SO_3M'Z$ group wherein M' is a member selected from the group consisting of beryllium, magnesium, calcium, zinc, strontium, barium, and tin; and Z is an acyloxy radical —OOCR" in which R" is a monovalent hydrocarbyl radical; Y is a member selected from the group consisting of a Y' group and an —$SO_3M'Z$ group; R is a member selected from the group consisting of a hydrogen atom and an alkyl radical containing from 1 to 10 carbon atoms; and $n$ is an integer having a value of 1 to 10, and (3) at least one different compound selected from the group consisting of the aromatic dicarboxylic acids and the dialkyl esters thereof.

2. A linear polyester consisting of the condensation product of dimethyl terephthalate, ethylene glycol, and from about 0.1 to about 10 mole percent, based on the total amount of dicarboxylic acid compounds present, of sodium 9,9-di-(2'-carbomethoxyethyl)-fluorene - 2 - sulfonate.

3. A linear polyester consisting of the condensation product of dimethyl terephthalate, ethylene glycol, and from about 0.1 to about 10 mole percent, based on the total amount of dicarboxylic acid compounds present, of disodium 9,9 - di-(2'-carbomethoxyethyl)-fluorene-2,7-disulfonate.

4. A linear polyester consisting of the condensation product of dimethyl terephthalate, ethylene glycol, and from about 0.1 to about 10 mole percent, based on the total amount of dicarboxylic acid compounds present, of the bis-(2-methylpentyl ester of potassium 9,9-di-(2'-carboxyethyl)-fluorene-2-sulfonate.

5. A linear polyester consisting of the condensation product of dimethyl terephthalate, ethylene glycol, and from about 0.1 to about 10 mole percent, based on the total amount of dicarboxylic acid compounds present, of disodium 9-(2'-carbomethoxyethyl)-9-(5'-carbomethoxypentyl)-fluorene-2,7-disulfonate.

References Cited by the Examiner
UNITED STATES PATENTS

| | | | |
|---|---|---|---|
| 3,018,272 | 1/62 | Griffing | 260—75 |
| 3,096,358 | 7/63 | Horn | 260—429.7 |

FOREIGN PATENTS

| | | |
|---|---|---|
| 549,179 | 7/56 | Belgium. |

WILLIAM H. SHORT, *Primary Examiner.*

P. E. MANGAN, LOUISE P. QUAST, *Examiners.*